United States Patent [19]
Varnham et al.

[11] Patent Number: 5,419,194
[45] Date of Patent: May 30, 1995

[54] SINGLE AXIS RATE SENSOR NOISE REDUCTION

[75] Inventors: Malcolm P. Varnham; Huw D. Thomas, both of Plymouth, Great Britain

[73] Assignee: British Aerospace Public Limited Company, Hampshire, Great Britain

[21] Appl. No.: 44,607

[22] Filed: Apr. 9, 1993

[30] Foreign Application Priority Data

Apr. 10, 1992 [GB] United Kingdom ................. 9207886

[51] Int. Cl.⁶ ........................ G01P 9/04; G01P 15/125
[52] U.S. Cl. .................................................... 73/505
[58] Field of Search .......................................... 73/505

[56] References Cited

U.S. PATENT DOCUMENTS

| | | | |
|---|---|---|---|
| 4,996,877 | 3/1991 | Stewart et al. | 73/505 |
| 5,218,867 | 6/1993 | Varnham et al. | 73/505 |
| 5,226,321 | 7/1993 | Varnham et al. | 73/517 A |

FOREIGN PATENT DOCUMENTS

| | | |
|---|---|---|
| 153189 | 8/1985 | European Pat. Off. . |
| 1303237 | 1/1973 | United Kingdom . |
| 2061502 | 5/1981 | United Kingdom . |
| 2154739 | 9/1985 | United Kingdom . |

Primary Examiner—Hezron E. Williams
Assistant Examiner—Helen C. Kwok
Attorney, Agent, or Firm—Cushman, Darby & Cushman

[57] ABSTRACT

A single axis rate sensor comprising a cylinder positioned about an axis and having primary and secondary drive and pick-off transducers and primary and secondary control loops. The primary control loop is provided for maintaining resonance of the cylinder by generating a ninety-degree phase shift between the primary drive transducer and the primary pick-off transducer. The secondary control loop is provided for receiving a signal from the secondary pick-off transducer indicative of rotation of the cylinder and for nulling the secondary drive transducer to zero. The primary control loop includes a phase-locked loop having a phase detector configured to operate at quadrature. By operating the demodulator in quadrature the demodulator and loop filter combination are a linear device which will not mix the microphonic baseband signal with the carrier. There will therefore be a reduction and possibly an elimination of the modulation of the voltage controlled oscillator by microphonic noise.

5 Claims, 6 Drawing Sheets

SINGLE AXIS RATE SENSOR NOISE REDUCTION

FIELD OF THE INVENTION

The present invention relates to noise reduction in rate sensors and relates particularly, but not exclusively, to noise reduction in single axis rate sensors.

DESCRIPTION OF PRIOR ART

Figure 1:
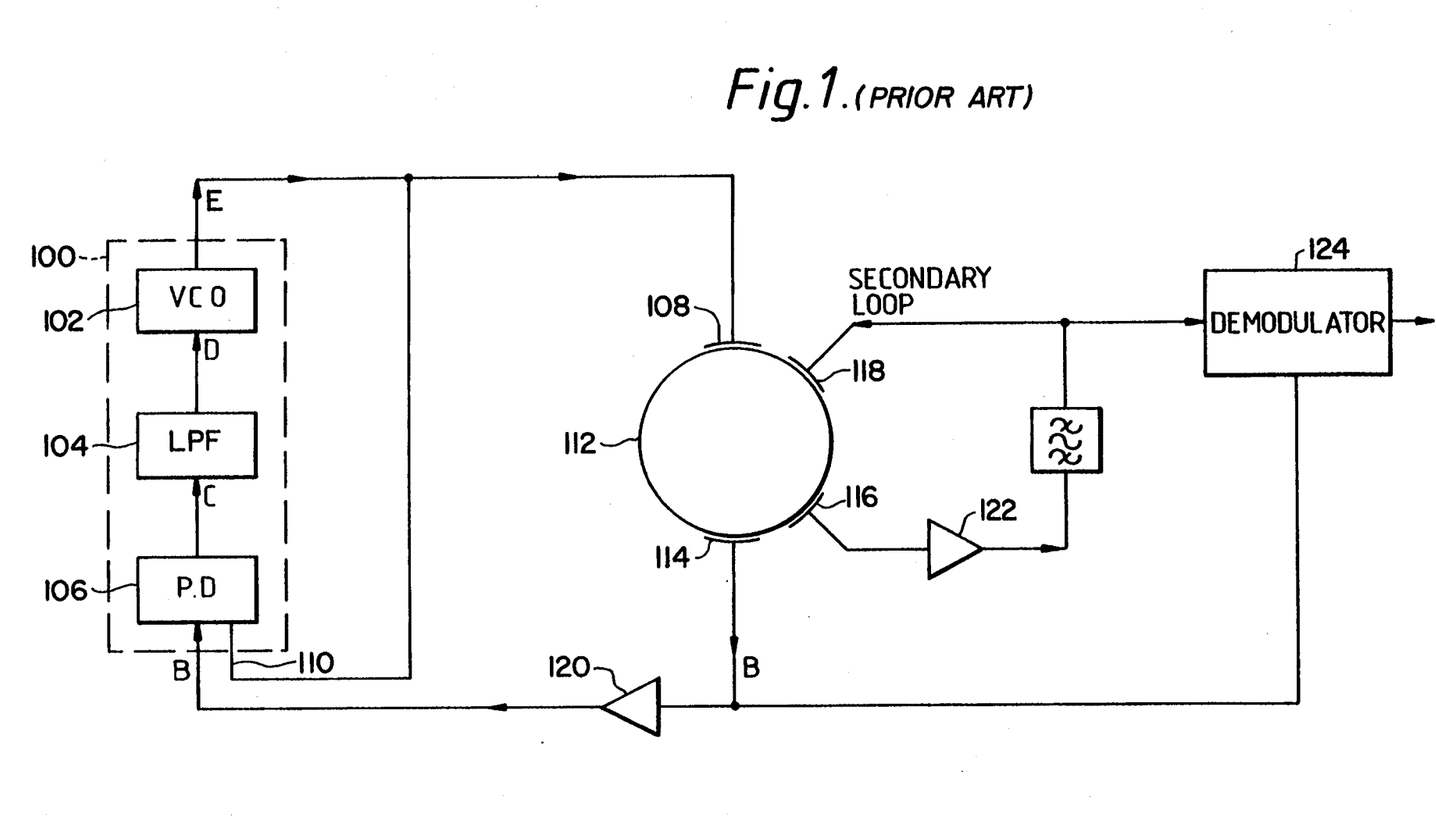
FIG. 1 illustrates a system diagram for a single axis rate sensor of the type well known in the art.
Figure 2:
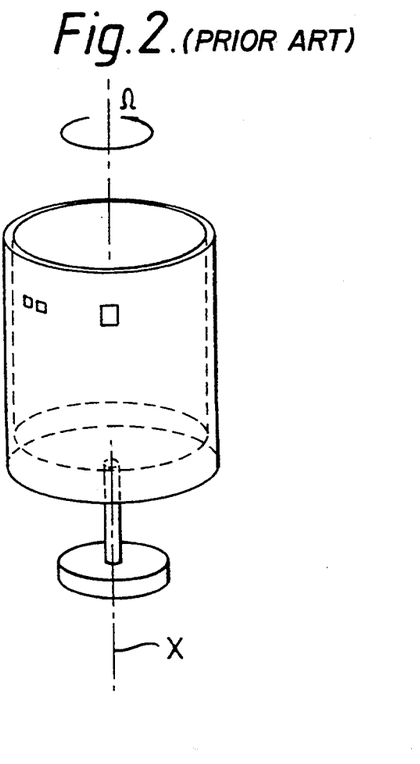
FIG. 2 illustrates a vibrating cylinder of the type incorporated in the prior art arrangement, and illustrates the electrode positions thereon.
Figure 3:
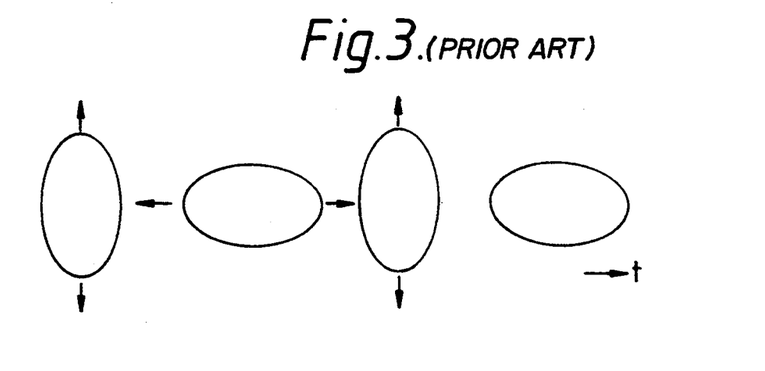
FIG. 3 illustrates the vibration nodes of the structure illustrated in FIG. 2.
Figure 4:
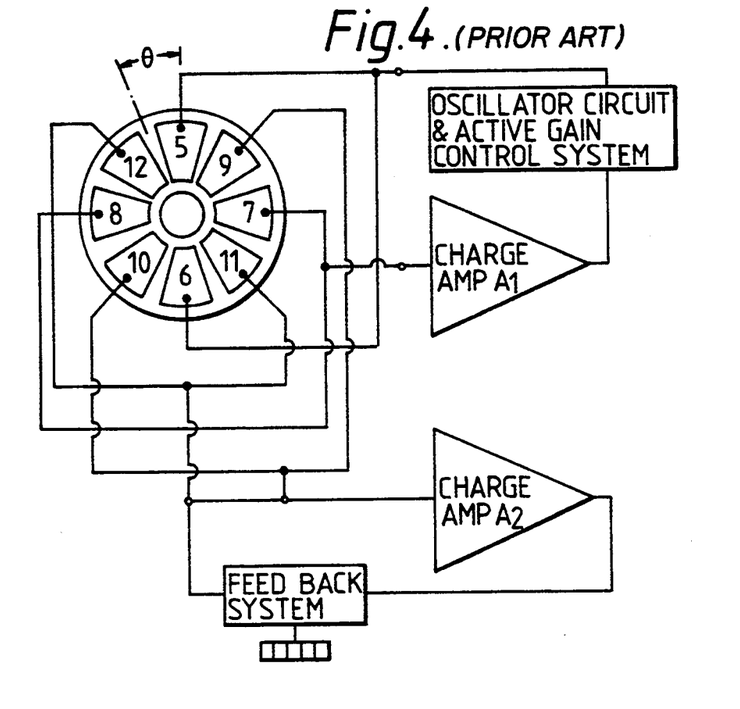
FIG. 4 illustrates a similar device of unitary construction made from piezoelectric material where the drive and pick-up transducers are formed by polarizing the material between electrode regions.

FIG. 1 shows a system diagram of a single axis rate sensor of the type described in British Patent Numbers GB 2061502 and GB 2154739. The cylinder of the rate sensor 112 is driven into resonance by applying an oscillating electronic signal to the drive transducers. The vibration pattern, viewed from the top, of the resonant mode is shown in FIG. 2. There are anti-nodes of maximum radial vibration and nodes of minimum radial vibration present. The primary loop maintains this resonance by ensuring a 90 degree phase shift between the primary drive transducers and the primary pick-off transducers.

When the rate sensor is rotated, the resonant node rotates with respect to the cylinder, and the signal can be detected on the secondary pick-off transducer. This signal is amplified and fed back to the secondary drive transducer in order to null it to zero. The strength of this nulling signal is proportional to a rotation rate. The signal is demodulated and output as a DC rate signal.

The vibration pattern can have a different shape to that shown in FIG. 2. However, the vibration pattern must have nodes and anti nodes occurring cylindrically around the perimeter of the cylinder 112. The cylinder 112 does not have to be driven exactly at resonance—but in practice it is desirable to do so. The resonant body neither has to be circular, nor cylindrical. Hemispheres and rings can be used. However, it is desirable that the oscillating nodes seen by primary and secondary electronic circuits (referred to as the primary and secondary resonances) have the same, or nearly the same, resonant frequency.

In FIG. 1 a metal cylinder 112, closed at one end and supported by a stem, is driven into resonance using piezoelectric elements stuck onto the metal cylinder, see for example FIG. 2. The piezo electric elements are also used to pick-off the movement.

GB2154739 describes a similar device of unitary construction made from piezo electric material where the drive and pick-off transducers are formed by polarizing the material between electrode regions. Both of the above mentioned patents describe similar electronic circuits to that shown in FIG. 1. From FIG. 1 it can be seen that the phase locked loop 100 (PLL) comprises a phase detector 106, a low pass filter 104 and a voltage controlled oscillator 102 (VCO). The VCO 102 output is connected to both the primary drive electrode 108 and the reference input 110 of the phase detector 106. The phase detector 106 is configured such that it outputs a signal C which is proportional to the phase difference between the signals at its inputs. The phase detector 106 used here has a zero output when the inputs are in quadrature, i.e., it is a quadrature phase detector. When the loop is locked, the phase detector input signals (110 and B) are in quadrature, and thus the cylinder 112 is at resonance. Any alteration in the phase of signal B is sensed by the phase detector 106, which outputs a correction signal C, which is filtered and used to control the phase of the VCO signal E.

Under vibration conventional rate sensors experience noise in the primary and secondary loops. Referring to the primary loop, the oscillation frequency for typical cylinders is 8 kHz to 25 kHz, depending on size and performance. These frequencies are well above the typical at random vibration spectra, say 20 Hz to 3 kHz. Nevertheless it is found in practice that random vibrations are coupled through the cylinder 112 and that the pick-off transducers 114, 116 act like microphones, i.e., output a signal approximately proportional to the input vibration. This microphonic process is linear, i.e., no mixing of signals occurs at this stage as far as it is possible to detect. Typical phase-lock loop integrated circuits for this frequency of operation use digital techniques to implement the phase detector 106. Signals 110 and B are in effect passed through comparators 120 to generate square waves which are then processed digitally to measure the phase difference between them. The square wave generation process mixes the microphonic noise with the carrier signal on B. The subsequent phase detection process is then corrupted by the microphonic noise which appears back at base band and corrupts the phase error signal at C. Signal C plus microphonic noise is then filtered and used to control the VCO 102. The VCO 102 is then modulated such that the squared up signal A tracks the squared up signal plus microphone noise at B within the bandwidth of the loop. The net affect of this is that the primary drive signal is modulated by noise, where the noise modulation appears as phase modulation around the carrier.

Referring now more particularly to the problems associated with the secondary loop, any signal seen on the secondary pick-off transducer 116 is amplified, filtered, and fed back to the secondary drive transducer in order to null the secondary pick-off signal to zero. The amplitude of the nulling signal is a measurement of rotation rate. This amplitude is measured by demodulating the secondary drive signal with respect to the primary pick-off signal which is phase shifted by 90 degrees. If the primary drive signal contains noise around the carrier, this noise would also be seen by the second pick-off transducer—either when the device is turned or as a modulation of a bias signal arising from manufacturing tolerances. The secondary drive signal must null the noise signal, and there will therefore be noise present around the carrier at the signal input to the demodulator. The rate output will therefore have a noise component at baseband. A second mechanism for noise arises from the original microphonic baseband noise present on the primary pick-off transducer 114. If the primary pick-off signal is squared up in a comparator 122 in order to use it as the reference input for the demodulator 124, then the microphonic noise will be mixed with the carrier signal causing sidebands around the carrier. If a signal, bias, or quadrature bias signal exists on the demodulator input, then the noise around the carrier on the reference input would be mixed down to baseband and appear as a baseband noise component on the rate output.

To summarize, cylinders, particularly those made from piezoelectric materials, output microphonic signals in respect to the input vibration noise. Practical phase-locked loop chips utilizing comparators at their inputs mix the microphonic noise with the carrier at the signal input. The effect is to phase modulate the signal from the VCO 102—i.e., the primary drive signal onto the cylinder 112. Noise present on the secondary pick-off transducer 116 is nulled by the secondary loop. Thus the signal input to the demodulator has noise around the signal component. The demodulator 124 will mix the noise seen at the signal input down to baseband, and the rate sensor is therefore sensitive to vibration. Practical phase detectors 106 often use analog switches to perform the phase detection process. This requires the reference input to be a square wave. The reference is derived by squaring up the primary pick-off signal and passing it through a comparator 120. This process mixes the microphonic noise and the resulting demodulating process mixes the noise down to baseband if there is a bias, quadrature, or signal component at the demodulator signal input.

It is an object of the present invention to reduce the problems associated with noise in the above mentioned conventional sensors.

SUMMARY OF THE INVENTION

Accordingly, the present invention provides a sensor for detecting rotational movement about an axis including a cylinder positioned about said axis, primary and secondary drive transducers for applying radial vibrations to said cylinder, primary and secondary pick-off transducers for detecting the presence of vibrations induced in said cylinder, a primary control loop for receiving a signal from the primary pick-off transducer and maintaining resonance by generating a ninety degree phase shift between the primary drive transducer and the primary pick-off transducer, a secondary control loop for receiving a signal from the secondary pick-off transducer indicative of rotation thereof and for directing said signal to the secondary drive transducer so as to null it to zero, said primary control loop including a phase locked loop having a phase detector configured to operate at quadrature, a low pass filter and a voltage controlled oscillator.

By operating the demodulator in quadrature the demodulator and loop filter combination are a linear device which does not mix the microphonic base band signal with the carrier. There will therefore be a reduction and possibly an elimination of the modulation of the voltage controlled oscillator by microphonic noise.

Preferably the sensor includes a connection means for connecting a reference signal from the primary loop demodulator to a reference input in the output demodulator. This arrangement ensures that the output demodulator's phase reference is held at 90 degrees with respect to the primary pick-off signal to within the phase-error accuracy of the voltage control oscillator control loop. Phase errors in the output demodulator are very undesirable because they induce drifts. In addition, this aspect reduces and may even eliminate, phase noise on the output demodulator reference input, which in turn reduces another noise-under-vibration source.

Advantageously, the sensor includes a gain control signal deriving means including a control demodulator for demodulating a signal B from the primary pick-off at 90 degrees with respect to the voltage controlled oscillator output signal E. This arrangement ensures that microphonic noise does not amplitude modulate the primary drive signal.

Advantageously, the sensor may also include a logarithmic amplifier for amplifying a signal B from the primary pick-off prior to the signal being passed to the demodulator of the phase locked loop. The amplifier provides an increased gain at small signal amplitudes (e.g. when the phase-locked loop is not locked) in order to improve the sensors start-up characteristics.

Preferably, the sensor includes a high pass filter in the secondary circuit for filtering a signal from the secondary pick-off transducer prior to the signal being passed to the secondary loop filter. This arrangement helps reject the sideband microphonic noise from the high pass secondary pick-off electrode. If the signal is not high pass filtered, then microphonic noise can be amplified by the secondary loop filter and fed back to the cylinder on the secondary drive electrode. Moreover, it is fed to the output demodulator which must then reject the sideband noise.

Preferably, the secondary loop filter comprises in phase and quadrature demodulators to transfer bandpass signals to baseband, in phase and quadrature filters, and in-phase and quadrature modulators to translate baseband information back to bandpass for filtering as an in-phase signal and a quadrature signal. An integrator may be included in the filter stage. The process is carried out in both the in-phase signal and the quadrature signal where the phases are with respect to the voltage control oscillator output. The combination of high-pass (or bypass) filtering together with demodulation/filtering/modulation ensures that microphonic noise is rejected in the secondary loop.

A gain stage may be added to the circuitry in order to amplify the primary drive signal before it is applied to the cylinder. This will have the advantage of increasing the vibration signal with respect to the measured microphonic noise. This gain stage can be implemented using a transformer.

Advantageously the size and shape of the cylinder are such as to ensure the maximum drive signal is applied to the cylinder.

DESCRIPTION OF THE DRAWINGS

The present invention will now be more specifically described with reference to the following drawings in which.

DETAILED DESCRIPTION OF THE PRESENT INVENTION

Figure 5:
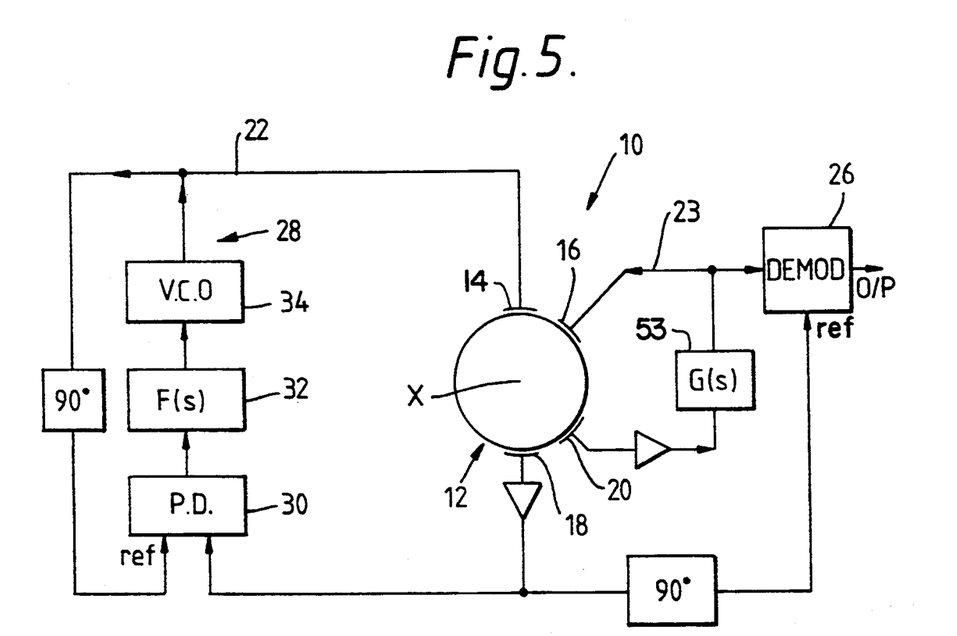
FIGS. 5 to 10 illustrate a rate sensor according to the various different embodiments of the present invention.

Referring now to the drawings in general but particularly to FIG. 5, a vibrating rate sensor for detecting rotational movement about an axis includes a cylinder 12 positioned about an axis X, primary and secondary drive transducers 14, 16 for applying radial vibration to the cylinder 12, primary and secondary pick-off transducers 18, 20 for detecting the presence of vibration induced in the cylinder 12 and primary and secondary control loops 22, 23. The primary control loop 22 is provided for receiving a signal from the primary pick-off transducer 18 and for maintaining resonance of the structure by generating a 90 degree phase shift between the primary drive transducer 14 and the primary pick-off transducer 18. The secondary control loop 23 is provided for receiving a signal from the secondary pick-off transducer 20 which is indicative of rotation of the structure. This signal is directed to the secondary drive transducer 16 so as to null it to zero. The primary control loop 22 includes a phase locked loop 28 (PLL) having a phase detector 30 configured to operate at quadrature, a low pass filter 32 and a voltage controlled oscillator 34. The voltage control oscillator 34 provides an output signal for driving the primary drive transducer 14 and a 90 degree phase shifted reference signal (ref) for returning to phase detector 30 to form a portion of the phase locked loop 28. The operation of such primary drive circuits is well known in the art and is therefore not described in further detail herein. It should be noted, however, that in this arrangement a phase detector is implemented from the phase lock loop with a demodulator operated at quadrature. This demodulator plus loop-filter combination is a linear device which will not mix the microphonic baseband signal with the carrier. The arrangement therefore reduces, and may even eliminate, demodulation of the voltage control oscillator by microphonic noise.

Figure 6:
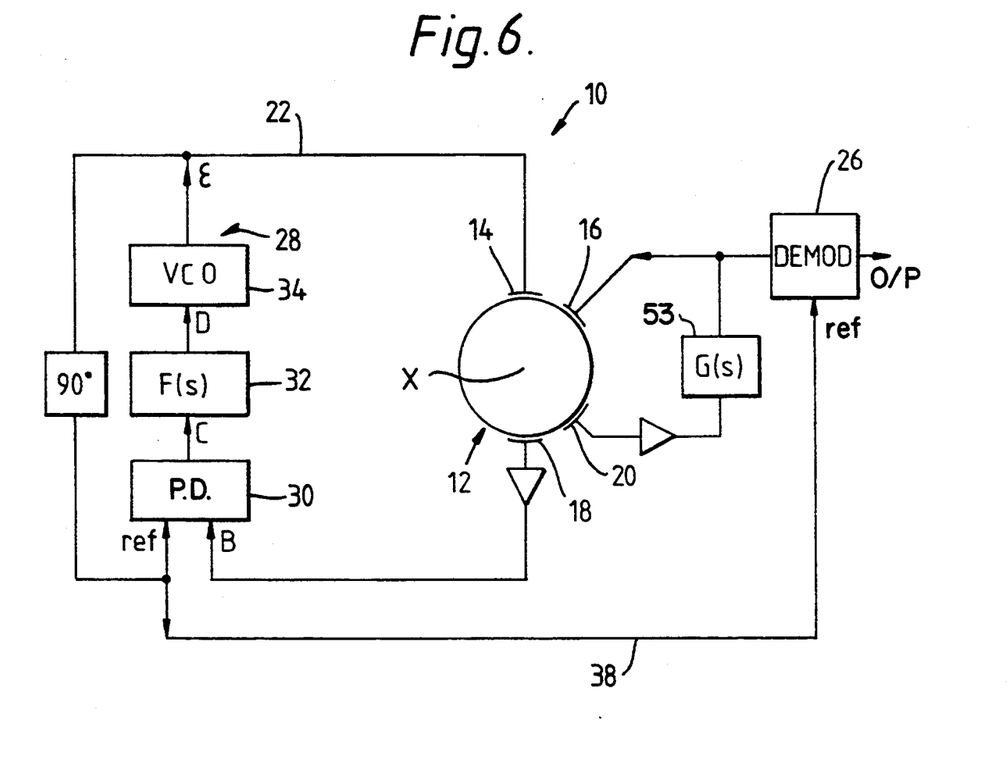

Turning now to FIG. 6, the reference signal to the primary loop demodulator may also be connected to the reference input of the output demodulator 26. This ensures that the output demodulator's phase reference is held at 90 degrees with respect to the primary pick-off signal within the phase-error accuracy of the control loop 22. This arrangement reduces and possibly eliminates phase errors in the output demodulator 26 which can result in induced drifts. In addition, this arrangement may even eliminate phase noise from the output demodulator reference input which in turn would reduce other noise under vibration source.

Figure 7:
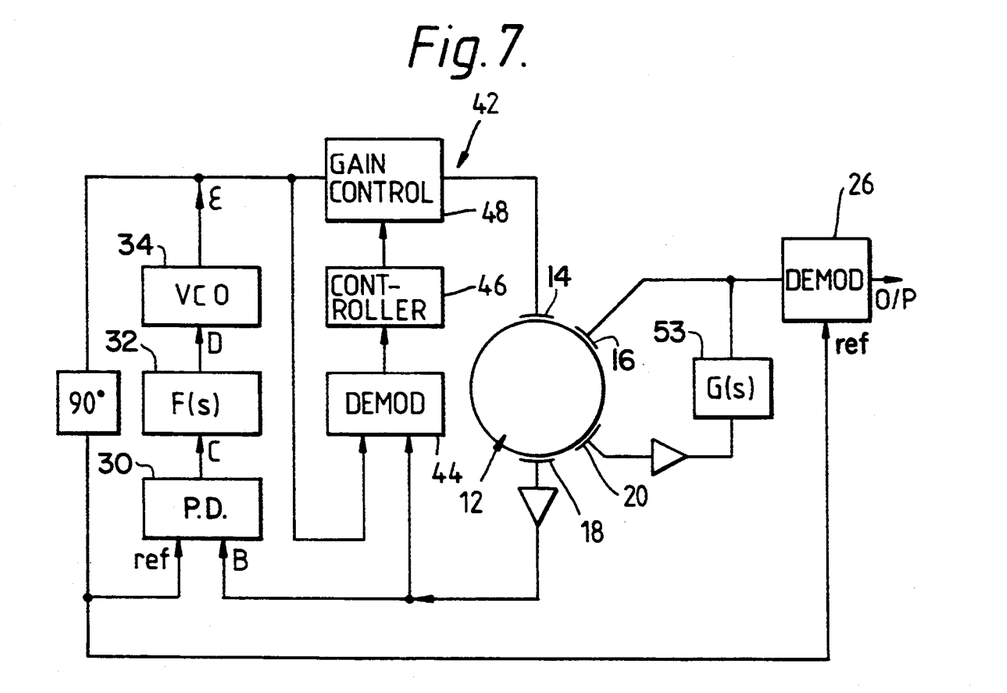

In FIG. 7 it will be seen that the present invention benefits from the incorporation of a gain control signal deriving means shown generally at 42 and comprising a demodulator 44, a controller at 46 and a gain control device 48. In operation, the gain control signal is derived by demodulating the primary pick-off signal at 90 degrees with respect to the voltage control oscillator output signal E. This ensures that microphonic noise does not amplitude modulate the primary drive signal thus further reducing noise in the sensor.

Figure 8:
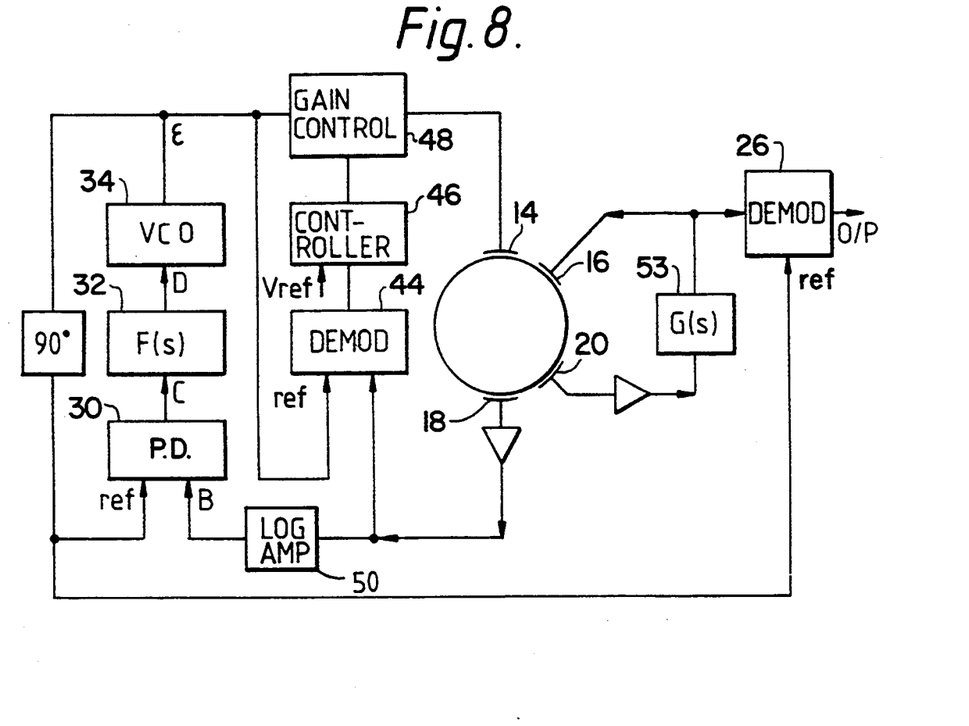

A logarithmic amplifier 50 may be provided as shown in FIG. 8 for amplifying a signal from the primary pick-off transducer 18 prior to said signal being passed to the demodulator 30 of the phase locked loop. This arrangement provides an increased gain at small signal amplitudes (e.g. when the phase-locked loop 28 is not locked) and would improve the sensor's start-up characteristics. It should be noted, however, care should be taken to ensure that mixing of the microphonic noise with the carrier signal provides a negligible increase of noise under vibration. However, once locked, the increased gain could be switched out of the control loop 22.

Figure 9:
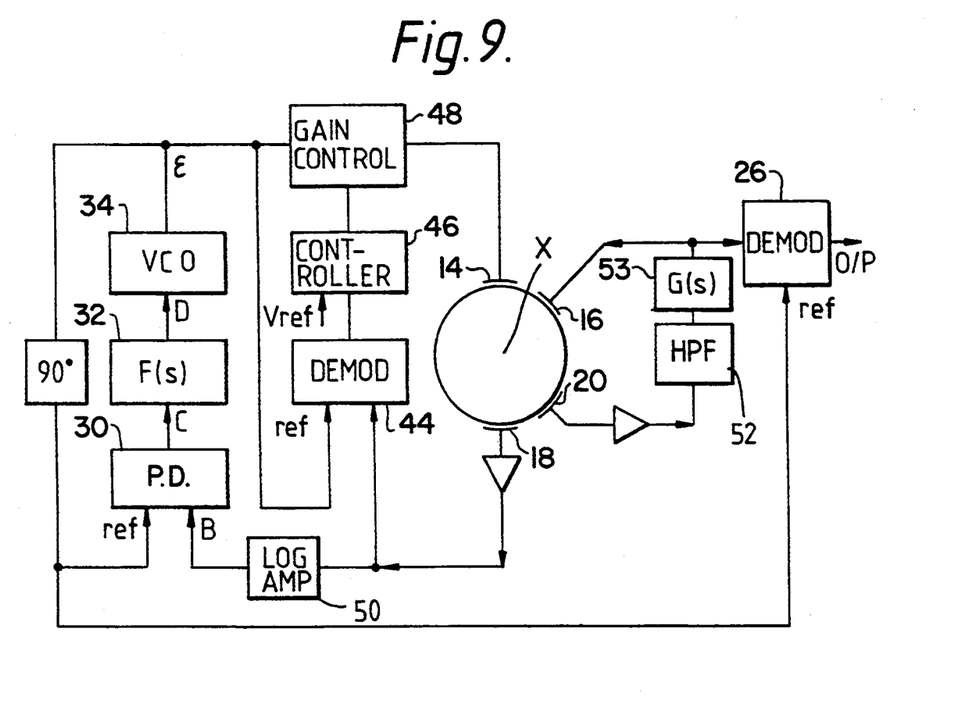

FIG. 9 illustrates a further arrangement of the present invention in which a high pass filter 52 is incorporated into the secondary control circuit 23. The high pass filter 52 acts to filter the signal from the secondary pick-off transducer 20 prior to said signal being passed to the secondary loop filter 53. Failure to provide the high pass filter 52 could result in the amplification of microphonic noise by the secondary loop filter 53 and feedback to the cylinder 12 by the secondary drive transducer 16. In addition to this, the signal is fed to the demodulator 26 which must then reject the baseband noise.

Figure 10:
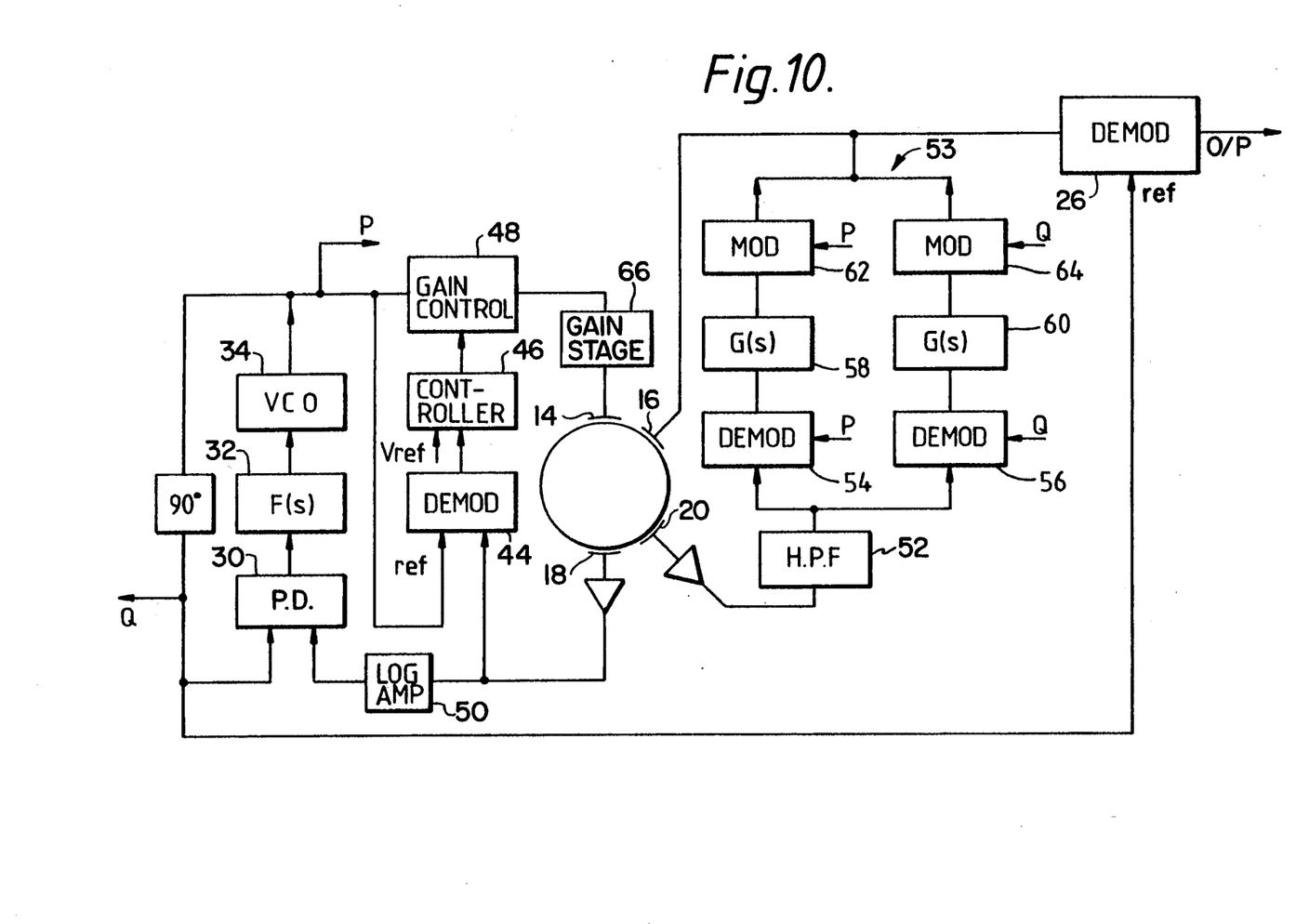

Referring to FIG. 10, the secondary filter 53 may be implemented using a demodulation stage 54, 56 to transfer bandpass signals to baseband, a filter stage 58, 60 possibly containing an integrator and a modulation stage 62, 64 to translate baseband information back to bandpass. This process is carried out on both the in-phase signal (P) and the quadrature signal (Q) where the phases are with respect to the voltage control oscillator output E. The combination of high-pass (or bandpass) filtering together with demodulation/filtering/modulation whilst not being mandatory ensures that microphonic noise is rejected in the secondary control loop 23. A gain stage 66 may be added to amplify the primary drive signal before it is applied to the cylinder 12 via the primary drive transducer 14. This gain stage can be implemented using a transformer. Such an arrangement would ensure that the vibration signal is increased with respect to the measured microphonic noise.

It will of course be appreciated that the primary drive electrode 14 is preferably optimized in size and shape in order to ensure the maximum drive is applied to the cylinder. This would allow an increase in the vibration signal with respect to the measured microphonic noise. For a cos (2 Θ) mode, the optimum angle attended by the electrode is 45 degrees and the primary drive signal should be applied to the opposite electrode as per the presently known arrangement. In addition, a primary drive signal which is inverted can be applied to the electrode at 90 degrees to the primary drive electrodes, while the other electrode at 90 degrees is used as a primary pick-off transducer.

We claim:

1. A sensor for detecting rotational movement about an axis, said sensor comprising:
   a cylinder, positioned about said axis;
   a primary and a secondary drive transducer for applying radial vibrations to said cylinder;
   a primary and a secondary pick-off transducer for detecting vibrations induced in said cylinder;
   a primary control loop, for receiving a signal from said primary pick-off transducer and for maintaining a resonance of said cylinder by generating a ninety degree phase shift between said primary drive transducer and said primary pick-off transducer;
   a secondary control loop, for receiving a signal from said secondary pick-off transducer indicative of a rotation of said cylinder and for directing said signal to said secondary drive transducer to null said secondary control loop to zero;
   a phase-locked loop in said primary control loop, and comprising a phase detector configured to operate at quadrature, a low-pass filter and a voltage-controlled oscillator; and
   a logarithmic amplifier for amplifying said signal from said primary pick-off transducer prior to being passed to said phase detector.

2. A sensor for detecting rotational movement about an axis, said sensor comprising:
   a cylinder, positioned about said axis;
   a primary and a secondary drive transducer for applying radial vibrations to said cylinder;
   a primary and a secondary pick-off transducer for detecting vibrations induced in said cylinder;
   a primary control loop, for receiving a signal from said primary pick-off transducer and for maintaining a resonance of said cylinder by generating a ninety degree phase shift between said primary drive transducer and said primary pick-off transducer;

a secondary control loop, for receiving a signal from said secondary pick-off transducer indicative of a rotation of said cylinder and for directing said signal to said secondary drive transducer to null said secondary control loop to zero;

a phase-locked loop in said primary control loop, and comprising a phase detector configured to operate at quadrature, a low-pass filter and a voltage-controlled oscillator; and a high pass filter in said secondary control loop for filtering a signal from said secondary pick-off transducer.

3. A sensor for detecting rotational movement about an axis, said sensor comprising:

a cylinder, positioned about said axis;

a primary and a secondary drive transducer for applying radial vibrations to said cylinder;

a primary and a secondary pick-off transducer for detecting vibrations induced in said cylinder;

a primary control loop, for receiving a signal from said primary pick-off transducer and for maintaining a resonance of said cylinder by generating a ninety degree phase shift between said primary drive transducer and said primary pick-off transducer;

a secondary control loop, for receiving a signal from said secondary pick-off transducer indicative of a rotation of said cylinder and for directing said signal to said secondary drive transducer to null said secondary control loop to zero; and a phase-locked loop in said primary control loop, and comprising a phase detector configured to operate at quadrature, a low-pass filter and a voltage-controlled oscillator;

wherein said secondary control loop further includes an in-phase process loop and a quadrature process loop, said in-phase process loop comprising:

an in-phase demodulator receiving said signal from said secondary pick-off transducer;

an in-phase filter connected to said in-phase demodulator; and an in-phase modulator connected to said in-phase filter; and said quadrature process loop comprising:

a quadrature demodulator receiving said signal from said secondary pick-off transducer;

a quadrature filter connected to said quadrature demodulator; and a quadrature modulator connected to said quadrature filter;

wherein said in-phase process loop is in parallel to said quadrature process loop in said secondary control loop.

4. A sensor as claimed in claim 3, further including an integrator in at least one of said in-phase and quadrature filters.

5. A sensor for detecting rotational movement about an axis, said sensor comprising:

a cylinder, positioned about said axis;

a primary and a secondary drive transducer for applying radial vibrations to said cylinder;

a primary and a secondary pick-off transducer for detecting vibrations induced in said cylinder;

a primary control loop, for receiving a signal from said primary pick-off transducer and for maintaining a resonance of said cylinder by generating a ninety degree phase shift between said primary drive transducer and said primary pick-off transducer;

a secondary control loop, for receiving a signal from said secondary pick-off transducer indicative of a rotation of said cylinder and for directing said signal to said secondary drive transducer to null said secondary control loop to zero;

a phase-locked loop in said primary control loop, and comprising a phase detector configured to operate at quadrature, a low-pass filter and a voltage-controlled oscillator; and a gain stage in said primary control loop for amplifying a drive signal to said primary drive transducer.

* * * * *